United States Patent [19]

El-Genk et al.

[11] Patent Number: 5,106,574
[45] Date of Patent: Apr. 21, 1992

[54] NUCLEAR REACTOR REFUELABLE IN SPACE

[75] Inventors: Mohames S. El-Genk, Albuquerque; David Buden, Idaho Falls, Id.; James E. Mims, Albuquerque, N. Mex.

[73] Assignee: University of New Mexico, Albuquergue, N. Mex.

[21] Appl. No.: 565,256

[22] Filed: Aug. 9, 1990

[51] Int. Cl.$^5$ .............................................. G21C 15/02
[52] U.S. Cl. .................................... 376/382; 376/909; 376/911; 376/265
[58] Field of Search ............... 376/265, 212, 213, 223, 376/318, 319, 382, 911, 909

[56] References Cited

U.S. PATENT DOCUMENTS

| | | | |
|---|---|---|---|
| 3,228,852 | 1/1966 | Holmes et al. | 376/319 |
| 3,336,203 | 8/1967 | Rausch et al. | 376/381 |
| 3,344,035 | 8/1967 | Buki | 376/381 |
| 3,366,545 | 1/1068 | Lewis et al. | 376/261 |
| 3,377,251 | 4/1968 | Hanthorn et al. | 376/212 |
| 4,106,984 | 8/1978 | Schneider | 376/265 |

OTHER PUBLICATIONS

El-Genk et al., Pellet Bed Reactor Design for Space Power, Aug. 87, Intersociety Energy Conversion Engineering Conference.
"Pellet Bed Reactor Design for Space Power" by M. S. El-Genk et al., 22nd Intersociety Energy Conversion Engineering Conference 1987.
"System Design Optmization for Multimegawatt Space Nuclear Power Applications", by M. S. El-Genk et al., Journal of Propulsion and Power, vol. 6, No. 2, pp. 194-202 (1990).

Primary Examiner—Brooks H. Hunt
Assistant Examiner—Frederick H. Voss
Attorney, Agent, or Firm—Ro051067122 Weig; Donovan P. Duggan; Deborah A. Peacock

[57] ABSTRACT

A lightweight three sector reactor for use in space. The three sectors provide redundancy for safety and operation assurance. The reactor can be launched empty or fueled and can be fueled, emptied, and refueled while in space. The reactor can be used to power manned space platforms.

5 Claims, 4 Drawing Sheets

NUCLEAR REACTOR REFUELABLE IN SPACE

This invention was made in part by an employee of the University of New Mexico.

BACKGROUND OF THE INVENTION

1. Field of the Invention (Technical Field)

The invention relates to nuclear reactors for use in space and more particularly to those which can be fueled, emptied and refueled in space and which incorporate redundancy and which are safe to launch and operate.

2. Description of the Related Art Including Information Disclosed under 37 C.F.R. §§1.97-1.99 (Background Art)

Solid core reactors, currently proposed for space power applications, have a single core structure with inlet and outlet coolant ducts. Such designs have the disadvantages of a single point failure, since a break in or rupture of a single pipe feeding or removing coolant from the core would result in a complete loss of coolant. Subsequently, heat generated by the radioactive decay of fission products would overheat the core structure beyond its design limit and might melt the core in the absence of an auxiliary core cooling system. Some designs employ an independent auxiliary cooling loop to remove the decay heat from the core in case of a failure of the primary loop. Although employing an auxiliary loop could avoid degradation of the core structure due to overheating, it increases the size and mass of the core and requires a complete shutdown of the reactor, thereby terminating the mission. An early termination will naturally result in significant losses in resources and scientific opportunities.

Another drawback of current solid core reactors is the need for at least two independent safety mechanisms, each of which is capable of shutting down the reactor during emergency. With these safety mechanisms in place, reactors are designed to remain subcritical during a launch abort resulting in a water immersion or core compaction.

SUMMARY OF THE INVENTION (DISCLOSURE OF THE INVENTION)

In accordance with the present invention there is provided a gas cooled nuclear reactor suitable for use in space. The reactor has a housing comprising a plurality of at least three sectors, each sector comprising a container for a reactor core separate and distinct from the reactor cores of the other sectors, each sector being capable of operating and cooled on its own and in cooperation with one or more of the other sectors. Each sector is subcritical for safe launching. Structure is associated with each sector for independently introducing gas coolant into and extracting coolant from each sector to cool the core therein. The reactor further comprises structure associated with each sector for independently fueling, emptying and refueling each sector. The fuel for the sector cores preferably comprises structurally self-supporting pellets, such as spheres. The fueling, emptying and refueling structure can comprise structure for using the vacuum of space in accomplishing fueling, emptying and refueling. In the event of failure of the cooling system of a core in a sector, one or more of the other sectors comprise structure for conducting heat away from the failed sector core and structure for radiating the heat away, thus maintaining sector operation. The sectors are preferably made of Mo, Mo-Re alloy, Mo alloy, Re alloy, or W-Re alloys.

One object of the present invention is to increase safety of operation and handling of reactors for use in space.

Another object of the invention is to provide for fueling, emptying, and refueling capability for reactors for use in space.

Still another object of the invention is to decrease maintenance problems and costs for reactors in space.

One advantage of the present invention is that in accordance therewith, the cooling system of one or more reactor core sectors can fail and the reactor will still operate.

Another advantage of the invention is that a reactor in accordance therewith is relatively light in weight.

Another advantage of the present invention is that operation of a reactor in accordance therewith is at relatively low temperature gradient and consequently at low stress to the materials thereof.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

In the drawings.

DETAILED DESCRIPTION OF THE PREFERRED EMBODIMENTS OF THE INVENTION (BEST MODES FOR CARRYING OUT THE INVENTION)

Figure 1:
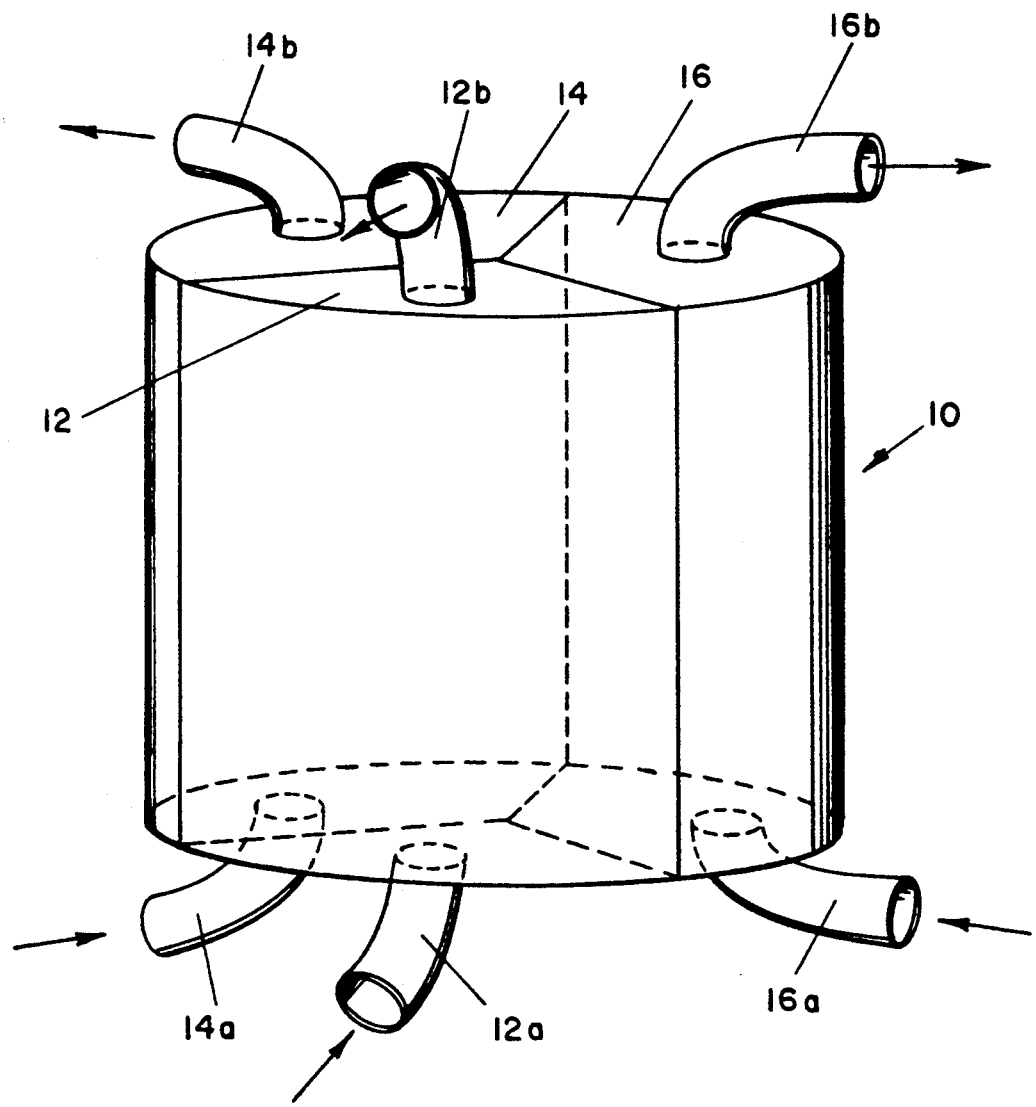
FIG. 1 illustrates a preferred embodiment of the invention having three independent core containing sectors.
Figure 2:
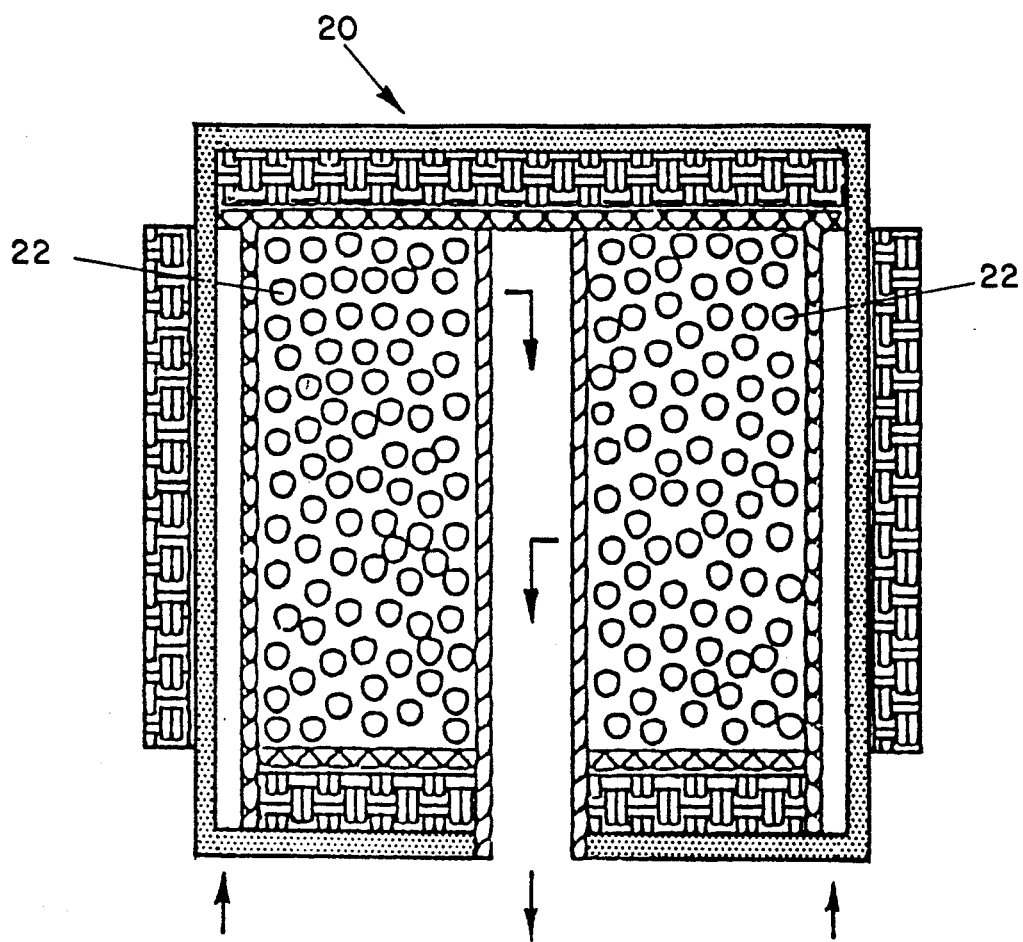
FIG. 2 depicts a core comprising large numbers of individual fuel pellets for use in the sectors of FIG. 1.

Reference is now made to FIG. 1 which illustrates a preferred embodiment of the invention. Gas cooled reactor 10 comprises three sectors 12, 14 and 16. Each sector has its own gas coolant inlet 12a, 14a, and 16a and its own outlet 12b, 14b and 16b. Each sector is structured to contain its own core separate and distinct from the cores of the other sectors and to be cooled independently from and in cooperation with other sectors. A representative core for use in any of the sectors of the FIG. 1 embodiment is illustrated in FIG. 2, to be hereinafter discussed. Although three sectors are shown for the preferred embodiment, more than three sectors can be used in practicing the invention. The use of a plurality of sectors provides redundancy and insurance of continued reactor operation even if one or more cores loses its active cooling. Adjacent sectors are capable of conducting heat from a malfunctioning sector and convecting that heat away using their own cooling system.

Figure 3:
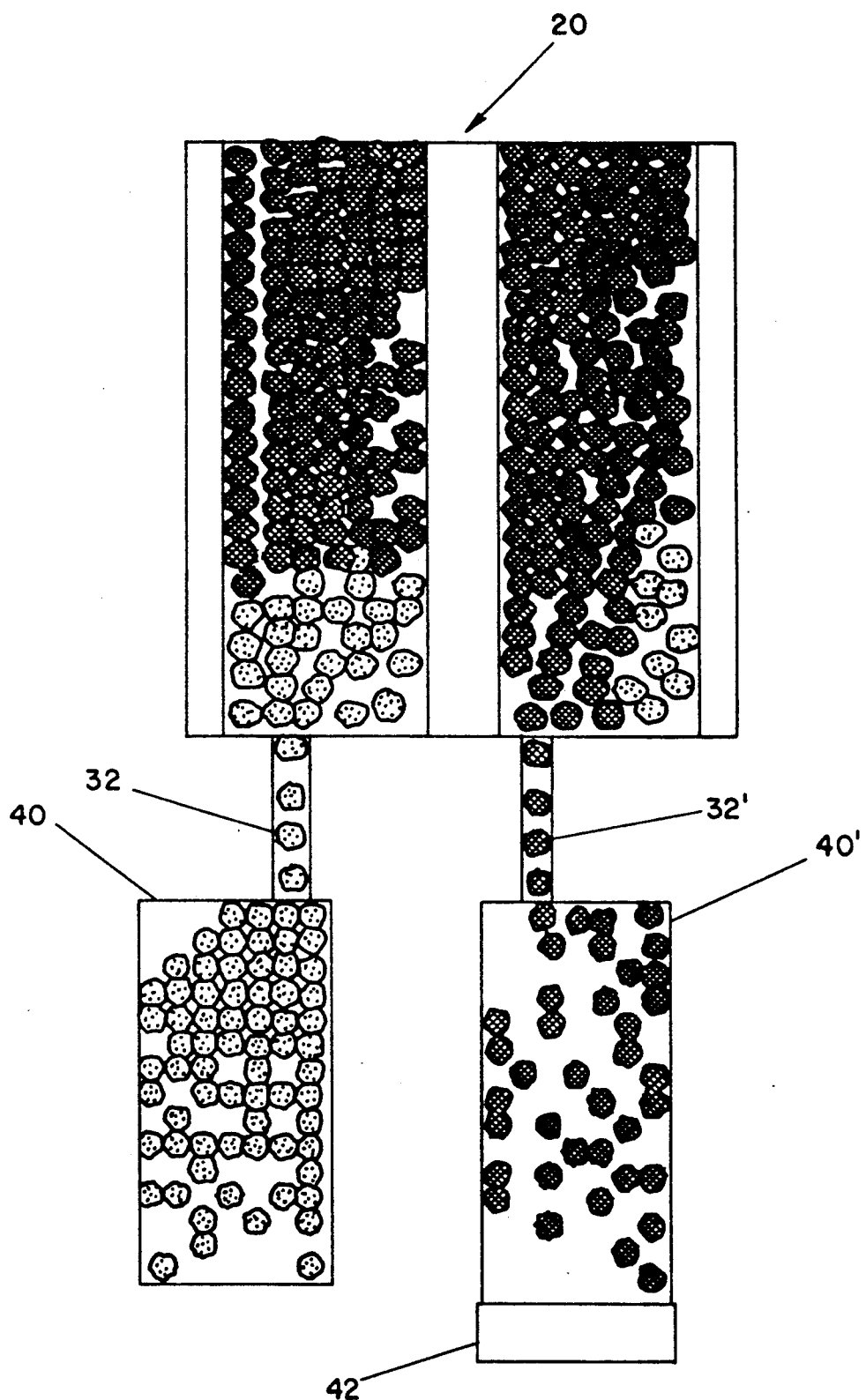
FIG. 3 shows how fueling and refueling can be carried out in space.

The reactor can be made of refractory metals structure, such as Mo Re, W-Re, alloys with graphite pellets containing TRISO fuel particles, or the like, and can be of any suitable size such as from 80×130 cm to 100×170 cm. The gas coolant can comprise any suitable coolant such as hydrogen, helium, or helium-xenon. Individual components suitable for use in each sector are known to practitioners of the art and are a matter of design choice. Too, each sector can comprise any known suitable reactor design. Thus, specific sector structure is not disclosed herein. Nevertheless, the preferred embodiment is particularly suitable for use with cores 20 comprising fuel pellets 22, as seen in FIG. 2. Preferably the pellets are spherical in order to maximize surface area to mass ratio to optimize cooling. Those skilled in the art will recognize that pellets for use with the invention need not be spherical, but can be cylindrical (short or long), cubical, or of any other shape. Too, the fuel microspheres in the pellets can be contained in a solid medium, such as graphite, and spaced from one another therein. Alternatively, the pellets can be poured into each sector to provide the cores thereof, as seen in FIG. 3. The pellets can be those taught in "Pellet Bed Reactor Design for Space Power," M. S. El-Genk, et al., 22nd *International Energy Conversion Engineering Conference*, Paper No. 879360, Philadelphia, Pa. (1987) and "System Design Optimization for Multimegawatt Space Nuclear Power Applications," M. S. El-Genk, et al., *Journal of Propulsion and Power*, Vol. 6, No. 2 (1990), as well as others known to practitioners in the art.

Figure 4:
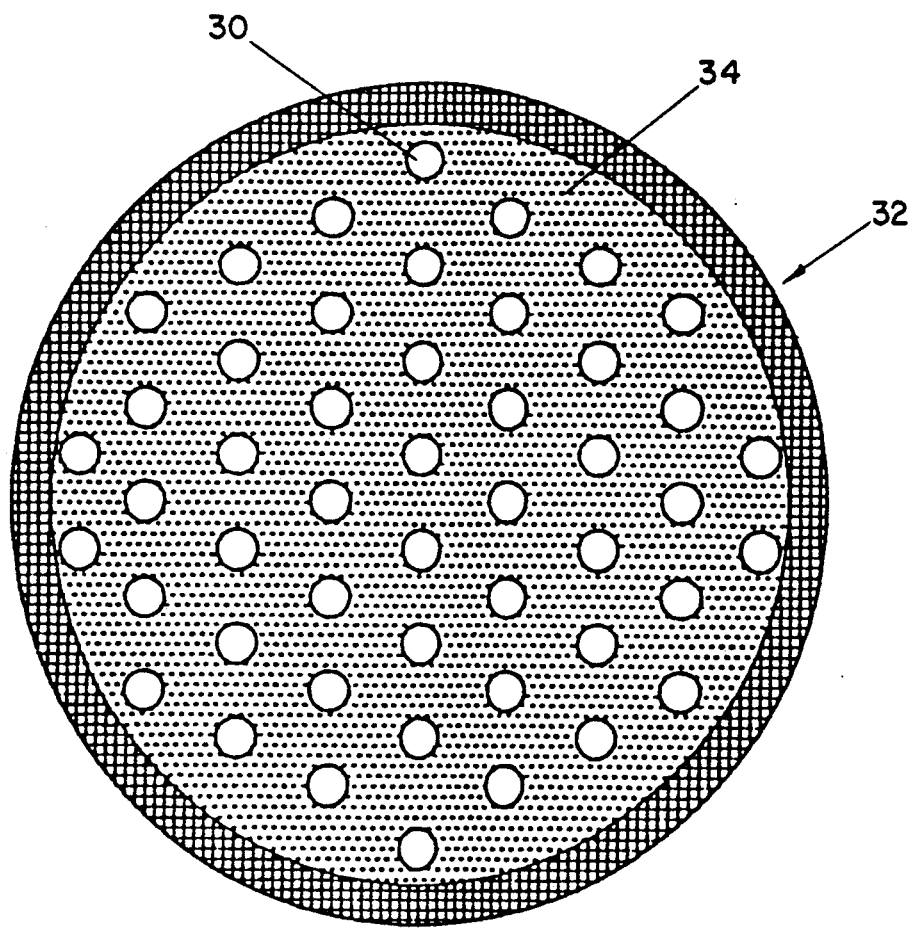
FIG. 4 is a cross sectional showing of a fuel pellet for use with the invention.

The reactor is particularly suitable to use in space where its unique refueling capability, the absence of single point failure, and low weight are advantageous. It can be fueled, emptied of fuel, and refueled in space using the vacuum of space, as seen in FIG. 3. Although it can be launched fueled, it can alternatively be launched empty and fueled in space. The pellets can be safely handled by skilled personnel wearing gloves since they only emit alpha radiation. The pellets are subjected only to low temperature gradients, hence, thermal stress is expected. Also, the microspheres 30 within the pellets 32 are preferably separated by a medium of graphite 34 to enhance heat conduction from microspheres to coolant and avoid stress which could occur had the microspheres been in direct contact, as seen in FIG. 4.

To simplify the safety procedures at launch, the invention, in addition to providing similar redundancy in the reactor operating and safety systems, provides for the launching of a reactor empty of fuel, if so desired. This significantly simplifies launch procedures, particularly in manned shuttle launches. Thus, in accordance with the invention and as shown in FIG. 3, reactor fuel pellets 32 can be launched separately in containers 40, each container holding sufficient fuel pellets to fill out a sector of the core and being pressurized with an inert gas. Each container 40 is subcritical during launch, a great safety advantage. Therefore, a user of the invention has the option of either launching a reactor loaded with fuel elements, or launching an empty reactor and fueling and refueling the reactor core after it is successfully deployed in orbit. The refueling option, coupled with the sectioned core of the invention, provide for longer lifetime in a space platform operated with a nuclear reactor, resulting in significant cost saving and enhanced safety and redundancy. In addition to the economical advantages and safety during launch, the refueling option simplifies the final disposal of the used fuel elements 32'. In accordance with the invention, core refueling can be handled from a distance, or performed with robots or automatic mechanisms. The vacuum of space can be used to pull the used pellets 32' from core 20, using, for example, a porous disk 42. Also, sectioning the reactor enables the completion of the mission, even if one or more of the sections suffer a loss of coolant. Thermal radiation to outer space from the failed sections as well as conduction to the other operating sections will be sufficient to remove the heat from the failed core section. Such a unique feature provides not only redundancy in the design, but also safety by eliminating the likelihood of a single-point failure in the core.

A reactor core, in accordance with the invention, is light in weight since the need for an auxiliary cooling system of the core in case of loss of coolant accident is eliminated. Also, since the pellets in the core are structurally self supported, the core requires no internal structure, resulting in lower reactor weight.

The invention has been described in detail with particular reference to a preferred embodiment thereof, but it will be understood that variations and modifications can be effected within the scope of the invention.

What is claimed is:

1. A gas cooled nuclear reactor suitable for use in space comprising:
   a lightweight structure comprising a plurality of at least three sections, each sector comprising a container for a reactor core separate and distinct from the reactor cores of the other sectors, each sector being capable of operating on its own and in cooperation with one or more of the other sectors and each sector having a common juncture with every other sector; and
   means associated with each sector for independently introducing gas coolant into and extracting coolant from each sector to cool the core therein, wherein in event of failure of the cooling system of a core in a sector, one or more of the other sectors comprise means for conducting heat away from the failed sector core and means for convecting the heat away, and wherein operation of said one or more other sectors is maintained.

2. The invention of claim 1 further comprising means associated with each sector for independently fueling, emptying and refueling each sector.

3. The invention of claim 2 wherein fuel provided to the sector cores comprises microspheres suspended in a solid medium to form pellets.

4. The invention of claim 2 wherein said fueling, emptying and refueling means comprises means for using the vacuum of space in accomplishing fueling, emptying and refueling.

5. The invention of claim 1 wherein said sectors are made from at least one group consisting of Mo, Mo-Re alloy, Mo alloy, Re alloy, and W-Re alloys.

* * * * *

UNITED STATES PATENT AND TRADEMARK OFFICE
CERTIFICATE OF CORRECTION

PATENT NO.  : 5,106,574
DATED       : April 21, 1992
INVENTOR(S) : Mohamed S. El-Genk, David Buden and James E. Mims It is certified that error appears in the above-identified patent and that said Letters Patent is hereby corrected as shown below:

On the title page:

Item  [75] Inventors, the first inventor's given name should be changed from "Mohames" to -- Mohamed --, and the first inventor's city and state should be changed from "Albuquerque" to -- Albuquerque, N. Mex. --.

Signed and Sealed this

Third Day of August, 1993

Attest:

MICHAEL K. KIRK

Attesting Officer

Acting Commissioner of Patents and Trademarks